United States Patent
Hallander et al.

(10) Patent No.: US 8,840,828 B2
(45) Date of Patent: Sep. 23, 2014

(54) HOT DRAPE FORMING BY MEANS OF A STIFFNESS CONTROLLED VACUUM BAG

(75) Inventors: Per Hallander, Linköping (SE); Mikael Petersson, Linköping (SE)

(73) Assignee: Saab AB, Linköping (SE)

( * ) Notice: Subject to any disclaimer, the term of this patent is extended or adjusted under 35 U.S.C. 154(b) by 240 days.

(21) Appl. No.: 13/126,990

(22) PCT Filed: Oct. 29, 2008

(86) PCT No.: PCT/SE2008/051225
§ 371 (c)(1),
(2), (4) Date: Jun. 29, 2011

(87) PCT Pub. No.: WO2010/050860
PCT Pub. Date: May 6, 2010

(65) Prior Publication Data
US 2011/0254207 A1    Oct. 20, 2011

(51) Int. Cl.
*B29C 33/58* (2006.01)
*B29C 70/44* (2006.01)

(52) U.S. Cl.
CPC ..................... *B29C 70/44* (2013.01)
USPC .......... 264/316; 264/468; 264/46.8; 264/510; 264/511; 264/553; 264/101; 264/102; 264/571; 264/241

(58) Field of Classification Search
USPC ........ 264/468, 46.8, 510, 511, 553, 101, 102, 264/571, 241, 316
See application file for complete search history.

(56) References Cited

U.S. PATENT DOCUMENTS 3,305,420 A    2/1967    Browniee et al.
3,666,600 A *  5/1972    Yoshino ........................ 156/382

(Continued)

FOREIGN PATENT DOCUMENTS

DE    1675715    *  7/2009
EP    0319449 A2    6/1989

(Continued)

OTHER PUBLICATIONS

PCT/ISA/210—International Search Report—Jun. 29, 2009.
PCT/ISA/237—Written Opinion of the International Searching Authority—Jun. 29, 2009.

*Primary Examiner* — Jeffrey Wollschlager
*Assistant Examiner* — Stella Yi
(74) *Attorney, Agent, or Firm* — Venable LLP; Eric J. Franklin (57) ABSTRACT

An apparatus and a method of conforming a blank onto forming surface sections of a forming tool by drawing a first vacuum against an elastic forming medium for transmitting forming forces from the elastic forming medium to the blank. The elastic forming medium is evacuated with the first vacuum for allowing the elastic forming medium to stretch and conform the blank to the forming surface sections. The elastic forming medium includes at least one void. A second vacuum is applied to the void for achieving a stiffened section of the elastic forming medium corresponding with the location of the void and corresponding with, when the elastic forming medium after the completion lies against the forming tool having the blank in between, a forming surface section of the forming tool where the blank requires a forming force being larger than that of surrounding sections of the elastic forming medium.

7 Claims, 4 Drawing Sheets

(56) References Cited

U.S. PATENT DOCUMENTS

| | | | |
|---|---|---|---|
| 4,824,631 A | | 4/1989 | Yeager |
| 4,842,670 A | | 6/1989 | Callis et al. |
| 5,052,906 A | * | 10/1991 | Seemann ............ 425/112 |
| 5,368,807 A | | 11/1994 | Lindsay |
| 6,017,484 A | | 1/2000 | Hale |
| 2004/0115299 A1 | | 6/2004 | Potter et al. |
| 2005/0194724 A1 | * | 9/2005 | Krogager et al. ......... 264/510 |
| 2005/0253309 A1 | * | 11/2005 | Hou et al. ............. 264/571 |
| 2006/0191624 A1 | * | 8/2006 | Whitworth et al. ......... 156/94 |

FOREIGN PATENT DOCUMENTS

| | | |
|---|---|---|
| EP | 0410599 A2 | 1/1991 |
| EP | 1393875 A1 | 3/2004 |
| EP | 1925436 A1 | 5/2008 |
| WO | WO-92/13695 A1 | 8/1992 |
| WO | WO-94/20278 A1 | 9/1994 |
| WO | WO-2008/086022 A1 | 7/2008 |

* cited by examiner

HOT DRAPE FORMING BY MEANS OF A STIFFNESS CONTROLLED VACUUM BAG

CROSS-REFERENCE TO RELATED APPLICATIONS

This application is the national phase under 35 U.S.C. §371 of PCT/SE2008/051225 filed 29 Oct. 2008.

TECHNICAL FIELD

The present invention relates to a method of conforming a blank onto forming surface sections and to an apparatus.

The article to be formed can be made of a thermo setting plastic, such as resin composite, epoxy resins or of a thermoplastic, polyester resin, fibreglass or carbon fibre reinforced plastic etc.

The present invention relates generally to aircraft industry, but is not limited to that.

BACKGROUND ART

The production of composite articles requires the use of pressure onto the blank for forming the blank against the forming surface sections. The elastic forming medium, such as a vacuum bag, is used to achieve said pressure such that wrinkles and trapped air in the blank can be forced out under vacuum pressure. The elastic forming medium can be used for curing the resin of the blank in an autoclave or in an oven at elevated temperature and pressure. After curing, the elastic forming medium is removed from the forming tool. The blank can be made of a so called "prepreg" material (layers or plies of fibre material previously impregnated with resin, such as thermosetting resin).

It is desirable that the formation of wrinkles, at the location of bevels or other projections of the article, is eliminated in the blank during the forming process.

One way to eliminate such wrinkles is described in US 2004/0115299 A1 disclosing a reusable vacuum bag. Herein is described that the vacuum bag can be made thinner within the area of a forming surface having small male or female radii to allow the reusable vacuum bag to more readily stretch and conform the blank to the forming surface.

The applicant of the present patent application has earlier filed a European patent application, not yet published, disclosing a method of conforming a blank onto a forming tool's forming surface sections by drawing vacuum against an elastic vacuum bag for transmitting forming forces to the blank. The elastic vacuum bag comprises permanently at least one elongated bag section having a different stiffness than other bag sections, wherein the location of the elongated bag section corresponds, when the elastic vacuum bag after the completion of the forming lies against the forming surface sections having the blank in between, with an elongated forming surface section of the forming tool where the blank requires a forming force being larger than that of the surrounding bag sections.

This earlier method described by the applicant is working satisfactory for directing the shearing process between the plies (or within the blank material) when formed over the forming tool.

However, there is still a need for controlling the shearing process and the forces onto the blank during the forming process per se in a flexible manner. There is also a need for providing an apparatus for conforming a blank onto a forming tool, wherein the apparatus is designed to exert variable forces and directions onto the blank depending upon the actual required forming forces to the blank must have for a specific phase during the forming process. There is also a need for providing one individual elastic forming medium that can be used for different forming tools having various forming surface sections.

There exists thus still a need to control the shearing process during the actual forming procedure between the plies of the blank being formed over the forming tool, for eliminating the risk that wrinkles appear within the plies or in the blank at the location of a bevel or other projections of the article. Other projections can be a step wise thickening of the article, wherein the steps project towards the forming surface keeping the outer surface even.

The object of the present invention is to overcome the drawbacks of known techniques and to develop the method and apparatus being disclosed in said earlier application of the present applicant.

SUMMARY OF THE INVENTION

This has been solved by a method being initially described in the introduction.

In this way a predetermined stiffness of one section of the elastic forming medium can be selected for an individual application. The stiffness of this section, being a larger stiffness than that of the surrounding sections of the elastic forming medium, means that a larger forming force will be generated by the elastic forming medium during the stretch within this section. By applying the second vacuum, or negative pressure of different amount in different forming stages, to the void, the quantity of the forming force can be controlled during the forming process. If more than two voids are comprised in the elastic forming medium, different negative pressures (defined as vacuum) can be applied for different voids thereby creating different forming forces for different forming surface sections of the forming tool. Also a plurality of voids can be used for creating an elongated stiffened section in a certain direction for controlling the direction of the forming force. Each void can be controllable with different negative pressure (vacuum) for achieving this.

Thus the quantity of the forming force can thus be controlled during the forming process in a flexible manner. By creating the elongated stiffened section, by means of controlling the application of the second vacuum, in a preferred direction relatively the article to be formed, both the direction and the quantity of the forming force can be controlled in an optimal way for forming the blank over the forming surface section of the forming tool. The forming surface comprises for example a bevel. At the same time there is achieved that a starting point for forming the blank over the bevel can be predetermined in an optimal way. This is made by providing one end of the elongated stiffened section essentially corresponding with the bevel's (the bevel of the forming tool can also be called elongated forming surface section) starting point of the forming tool, seen in a direction from the centre line when forming the blank over the forming surface sections of the forming tool. By deciding the stiffness of the elongated stiffened section, the speed that the elongated stiffened section will conform onto the elongated forming surface section can be controlled. It has been observed that the quantity and the direction of the forming force are of most importance in the beginning of the forming procedure, i.e. when the shearing between layers or plies starts. The elongated forming surface section of the forming tool, seen in a cross section, can be concave or convex.

By controlling the stiffness and the direction by means of the second vacuum, the elongated stiffened section will have a specific stiffening feature (making this section stiffener than surrounding sections of the elastic forming medium), and the direction of the forming force and the quantity of the forming force can be controlled in an optimal manner by the application of the second vacuum. The forming force generated by the stiffened elongated section is larger than the forming forces of the surrounding sections of the elastic forming medium. When the forming of the blank onto the forming surface section of the forming tool is finished, where the blank requires a forming force, generated by the elastic forming medium, being larger than that of surrounding sections of the elastic forming medium, the second vacuum is not any longer needed, whereby the elastic forming medium as a whole, without any stiffened section, will finish the forming procedure. This procedure is called a two-step forming.

Preferably, the step of applying the second vacuum to said void precedes the step of evacuating the elastic forming medium with the first vacuum.

In this way a stiffness of one section of the elastic forming medium is larger than that of the surrounding sections of the elastic forming medium in an initial phase of the forming procedure, meaning that a larger forming force can be generated for forming the blank over a forming surface section of the forming tool where the blank requires a forming force being larger than that of surrounding sections of the elastic forming medium even in the beginning of the forming procedure.

Suitably, the elastic forming medium comprises an upper elastic membrane and a lower elastic membrane being separable from each other creating the void for enclosing at least one vacuum conveyor being connected to a vacuum source creating the second vacuum.

Thereby the vacuum conveyor in the void between the upper elastic membrane and the lower elastic membrane easily can be exchangeable and thereby the elastic forming medium can be controlled to be of different stiffness. The vacuum conveyor can also, before the forming procedure starts, be rearranged to a different position between the membranes, wherein the direction and the quantity of the forming force can be controlled. Thereby the using of only one forming media is achieved for different applications of forming. Also the quantity of vacuum (negative pressure) can be regulated for controlling the direction and the quantity of the forming force.

Preferably, the vacuum conveyor is elongated.

Thereby the direction of the forming force can be controlled by arranging the vacuum conveyor in a certain direction corresponding with the prolongation of the elongated forming surface section of the forming tool.

Suitably, the upper elastic membrane is stiffer than the lower elastic membrane.

In such way the lower elastic membrane, having less stiffness than the upper elastic membrane, can be used for the final forming procedure, as a second forming step, of the blank when the second vacuum is not any longer applied to the vacuum conveyor in the void. This is advantageously, since the less stiff lower elastic membrane better can form the blank onto the forming tool without any counter force from the upper membrane.

Preferably, the step of evacuating the elastic forming medium is preceded by a step of heating the blank for increasing the viscosity of the blank.

Thereby the blank more easily can be formed over the forming tool. The heating of the blank can be made till a determined temperature for increasing the viscosity, but not so high that the blank will cure. The viscosity and the friction between plies of the blank are parameters involved with the forming procedure, and by increasing the viscosity, the forming of the blank can also be made with simplicity reducing forming manufacture costs.

Suitably, the forming tool comprises at least one supporting wall arranged for supporting the elastic forming medium such that the elastic forming medium is held a distance from the forming surface section of the forming tool before the step of evacuating the elastic forming medium.

Hereby the beforehand stretching of the elastic forming medium can be made without any mechanical equipment having moving parts. Preferably, the supporting wall surrounds the forming surface sections of the forming tool for providing a lift up of the entire elastic forming medium from the forming surface sections. Thereby several stiffened elongated sections (by means of the second vacuum) can act on the blank in any desired area of the forming surface sections. If the blank must be formed over an even more complex forming surface requiring a further forming force, the supporting wall is thus arranged higher than the forming surface section of the forming tool and the elastic forming medium will be stretched even more initially and additional shear forces will be generated onto the blank of that specific complex forming surface.

This has also been solved by an apparatus being initially described in the introduction.

In this way an apparatus is achieved having an elastic forming medium which is adapted for different forming surface sections of a forming tool. The forming tool is preferably exchangeable in the apparatus to another forming tool having a different forming surface section. One elastic forming medium can thus be used for the apparatus, which is cost effective. By application of a second vacuum in different stages of the forming procedure and even to different voids of the elastic forming medium a flexibility is achieved regarding variable quantities of forces and directions of forces generated by the elastic forming medium for forming the blank over the forming tool. In this way the apparatus is designed for controlling the shearing process of the blank during the forming process in a flexible manner. The apparatus is designed to exert variable forces and directions onto the blank depending upon the actual required forming force onto the blank for a specific phase during the forming process. A control unit is preferably connected to a vacuum source generating the second vacuum for controlling the quantity of negative pressure (vacuum) and is preferably adapted to select the void matching with the location of the forming surface section of the forming tool.

Preferably, the elastic forming medium comprises an upper elastic membrane and a lower elastic membrane being separable from each other creating the void for enclosing at least one vacuum conveyor being connected to a vacuum source creating the second vacuum.

Thereby the vacuum conveyor in the void between the upper elastic membrane and the lower elastic membrane can be exchangeable and thereby the elastic forming medium can be easily rearranged to be of different stiffness in different sections. Also, a thicker vacuum conveyor will be stiffer than a thinner vacuum conveyor during the application of the second vacuum. The vacuum conveyor can also, before the forming procedure starts, be rearranged to a different position between the membranes, wherein the direction and the quantity of the forming force can be controlled.

Suitably, the vacuum conveyor is elongated.

Thereby the direction of the forming force can be controlled by arranging the vacuum conveyor in a certain direction corresponding with the prolongation of the elongated forming surface section of the forming tool.

Preferably, the upper elastic membrane is stiffer than the lower elastic membrane.

Suitably, the forming tool comprises at least one supporting wall arranged for supporting the elastic forming medium such that the elastic forming medium is held a distance from the forming surface section before the step of evacuating the elastic forming medium.

BRIEF DESCRIPTION OF THE DRAWINGS

The present invention will now be described by way of examples with reference to the accompanying schematic drawings, of which:

FIG. 2b illustrates from above an elastic forming medium adapted for forming a blank over the forming tool in FIG. 2a;

FIG. 5c illustrates an article being formed by the apparatus in FIG. 5a;

FIG. 6a illustrates an elastic forming medium comprising four controllable voids stiffened by means of a second vacuum;

FIG. 6b illustrates a cross-section A-A of the elastic forming medium in FIG. 6a;

FIG. 6d illustrates a forming tool used with the elastic forming medium in FIG. 6a;

FIG. 7b illustrates a cross-section A-A of the elastic forming medium in FIG. 7a;

FIG. 7c illustrates the elastic forming medium in FIG. 7a controlled for a first application.

DETAILED DESCRIPTION

Hereinafter, embodiments of the present invention will be described in detail with reference to the accompanying drawings, wherein for the sake of clarity and understanding of the invention some details of no importance are deleted from the drawings.

Figure 1A:
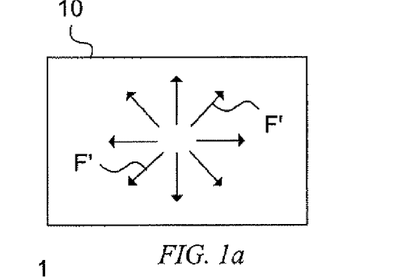
FIG. 1a illustrates from above an elastic forming medium without any stiffened sections.
Figure 1B:
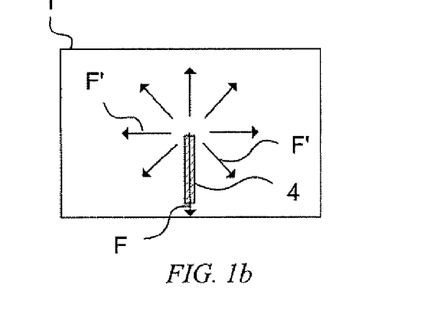
FIG. 1b illustrates from above a elastic forming medium comprising a stiffened elongated section achieved by a second vacuum.

FIG. 1a schematically illustrates the principle for an elastic forming medium 10 according to known technique. When the elastic forming medium 10 is stretched by a vacuum during the forming procedure, forming forces F' are created which act on the blank (not shown) to be formed. Since the elastic forming medium 10 has a uniform stiffness, the forming forces F' will be the same all over the area of the elastic forming medium 10. FIG. 1b schematically illustrates the principle of the use of an elastic forming medium 1 according to an embodiment of the invention having a stiffened elongated section 4 created by a second vacuum in an elongated void 3. The forming force F is larger than the forming forces F' of the surrounding sections of the elastic forming medium 1. The force F, being larger than forces F', is produced by the fact that the forming force is a function of the stretch (strain) of the elastic forming medium 1, wherein the stretch is dependent of the stiffness of the elastic forming medium. A larger stiffness of the stiffened elongated section 4 of the elastic forming medium 1 results in that a larger forming force F will be generated by the elastic forming medium 1 during the stretching process within this section.

Figure 2A:
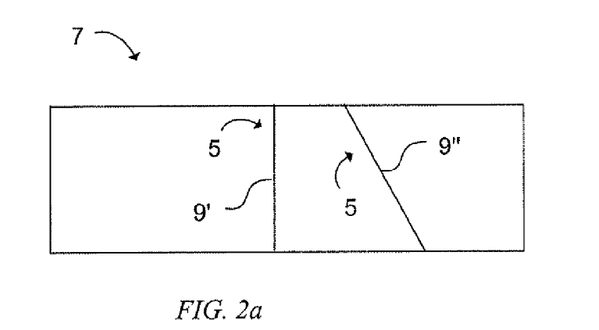
FIG. 2a illustrates in a side view a forming surface of a forming tool.
Figure 2B:
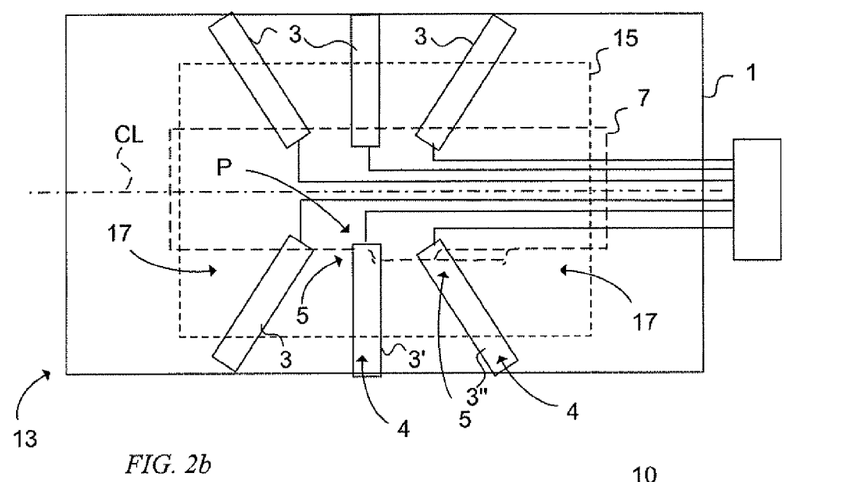
Figure 2C:
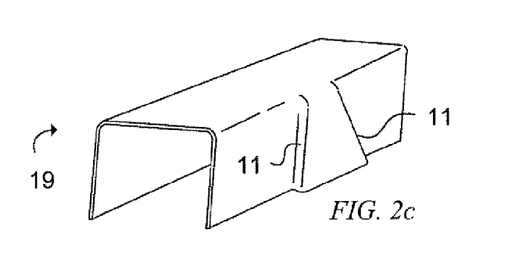
FIG. 2c illustrates in a perspective view an article formed by the elastic forming medium in FIG. 2b.

FIG. 2a illustrates schematically in a side view a forming surface section 5 of a forming tool 7. The forming surface section 5 comprises a vertical bevel 9' and an inclined bevel 9", both provided for a flange 11 of an article 19 to be formed as can be seen in FIG. 2c. FIG. 2c illustrates in a perspective view an article formed by the elastic forming medium 1 in FIG. 2b. FIG. 2b illustrates from above an apparatus 13 comprising a forming tool 7, an elastic forming medium 1 for conforming a blank 15 onto forming surface sections 5 of the forming tool 7 by drawing a first vacuum against the elastic forming medium 1 for transmitting forming forces from the elastic forming medium 1 to the blank 15. The elastic forming medium 1 comprises sex elongated voids 3, 3', 3". The voids 3', 3" are subject for (applied with) a second vacuum for achieving stiffened sections 4 of the elastic forming medium 1 corresponding with the locations of the voids 3', 3" and corresponding with, when the elastic forming medium 1 after the completion lies against the forming tool 7 having the blank 15 in between, forming surface sections 5 of the forming tool 7 where the blank 15 requires a forming force F being larger than that of the surrounding sections 17 of the elastic forming medium 1. For forming the blank 15 over the forming tool 7, the two elongated void sections 3'. 3" are thus stiffened by the application of the second vacuum. The second vacuum is applied before the application of the first vacuum. During the forming process the elastic forming medium 1 is stretched by the first vacuum and the elongated stiffened void sections 3, 3" start at the starting point P to form the blank 15 in a direction of the bevelled portions 9', 9". When the forming is finished over the bevelled portions 9', 9" and the forming has to continue for forming the rest of the blank 15 by means of the elastic forming medium 1, the second vacuum is closed wherein the stiffened elongated sections 4 will be essentially of the same elasticity as the surrounding sections 17. Thus the elastic forming medium 1 can be used for the final forming procedure, as a second forming step, of the blank 15 when the second vacuum is not any longer applied to the void.

Figure 3:
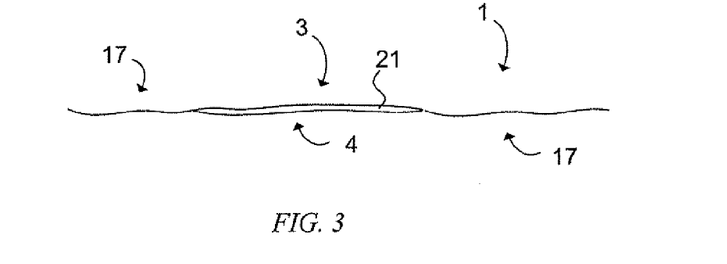
FIG. 3 illustrates the principle of drawing vacuum in a void of an elastic forming medium according to a first embodiment of the invention.

FIG. 3 illustrates the principle of drawing vacuum from a void 3 comprising a vacuum conveyor 21 of an elastic forming medium 1. The forming medium 1 comprises a single elastic rubber sheet and the void section is illustrated in a cross-section. The void section comprises two elastic rubber sheets being joined together so that a space is provided between said both elastic rubber sheets. When the second vacuum is applied for drawing air from the void 3, the both elastic rubber sheets of the void 3 will be pressed to each other and thereby creating a stiffened section. The both sheets will be pressed to each other and a high friction is created between them, thereby creating the stiffening feature. The stiffened section 4 is stiffer than surrounding sections 17 of the elastic forming medium 1.

Figure 4A:
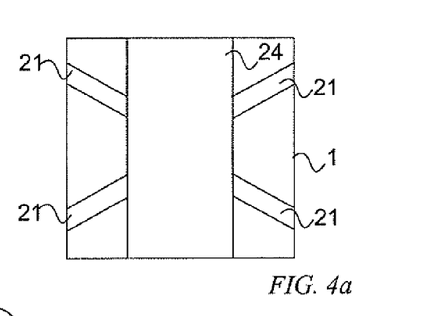
FIGS. 4a and 4c illustrate an elastic forming medium according to a second embodiment including vacuum conveyors for a first application.
Figure 4B:
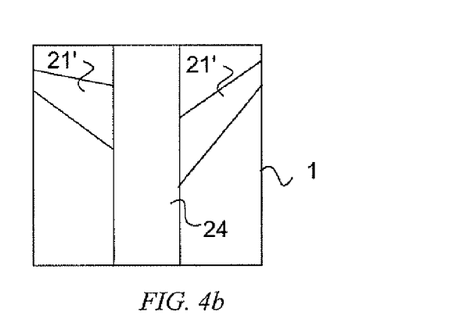
FIGS. 4b and 4d illustrate the elastic forming medium in FIG. 4a for a second application.
Figure 4C:
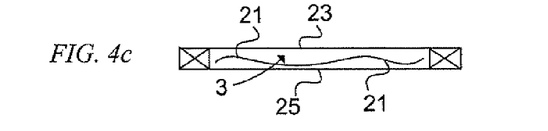
Figure 4D:
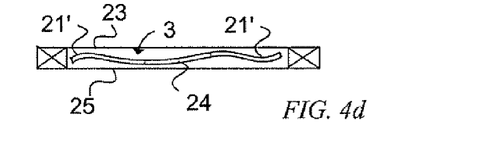

FIG. 4a illustrates from above an elastic forming medium 1 for a first application and FIG. 4b illustrates the same elastic medium 1 adapted for a second application. FIG. 4c illustrates schematically the elastic forming medium 1 of FIG. 4a in a cross-sectional view. In FIG. 4c is shown that the elastic forming medium 1 comprises an upper elastic membrane 23 and a lower elastic membrane 25 being separable from each other creating the void 3 for enclosing at least one vacuum conveyor 21 being connected to a vacuum source (not shown) creating the second vacuum. The vacuum source is the same as being used for producing the first vacuum. The vacuum conveyor 21 is a breather film arranged partially within the void 3. The vacuum conveyor 21 in the void 3 between the upper elastic membrane 23 and the lower elastic membrane 25 in FIG. 4a is exchanged to a thicker vacuum conveyor 21' shown in FIG. 4b. Thereby the elastic forming medium 1 can be achieved to have different stiffened sections. The vacuum conveyor 21' can also, as can be seen in FIG. 4b relatively FIG. 4a, before the forming procedure starts, be rearranged to a different position between the membranes 23, 25 (i.e. in the void 3), wherein the direction and the quantity of the forming force can be controlled. Thereby the using of only one elastic forming medium 1 is achieved for different applications of forming. By applying the four vacuum conveyors 21 in FIG. 4a a directed forming force of each vacuum conveyor is achieved when applying the second vacuum, wherein the forming force direction corresponds with the prolongation of the specific vacuum conveyor 21. By applying the two thicker vacuum conveyors 21', shown in FIG. 4b, a different forming force, having another direction and being of decreasing quantity, will be achieved. The vacuum conveyors 21, 21' are connected to a vacuum source (not shown) via a main vacuum conveyor 24.

Figure 5A:
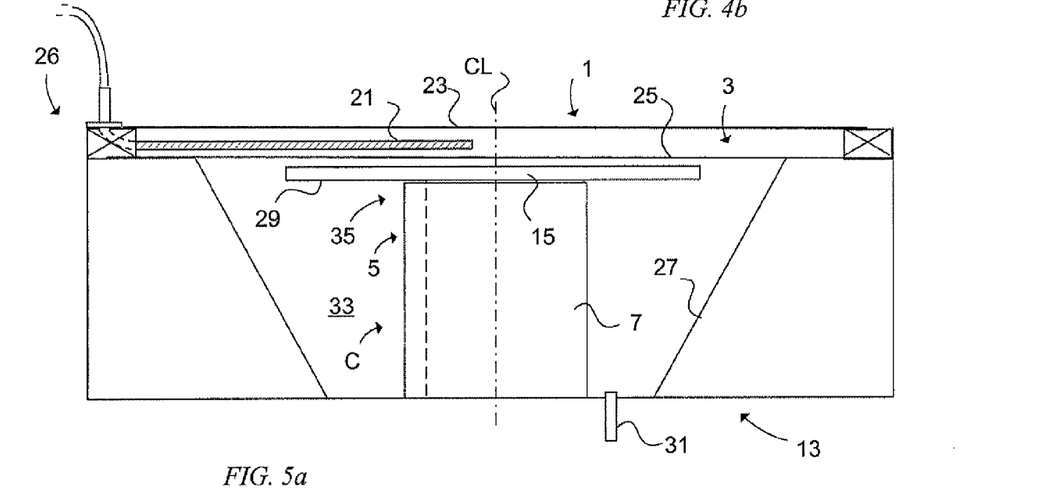
FIG. 5a illustrates an apparatus comprising a forming tool and an elastic forming medium.

FIG. 5a illustrates schematically an apparatus 13 comprising a forming tool 7 and an elastic forming medium 1. Between the forming tool 7 and the blank 15 is a release film (not shown) for easy separating the article from the forming tool 7. The forming tool 7 further comprises a supporting wall 27 arranged for supporting the elastic forming medium 1 such that the elastic forming medium 1 is held a distance from the forming surface section 5 of the forming tool 7 before the step of evacuating the elastic forming medium 1.

The procedure is that the blank 15 firstly is applied onto the forming tool 7. The flanges 29 can be supported by a support device (not shown), such as a support film or lamellas before the forming starts. Thereafter the elastic forming medium 1 is mounted onto the supporting wall 27 enclosing the blank 15 within the elastic forming medium 1.

The elastic forming medium 1 comprises the upper elastic membrane 23 and the lower elastic membrane 25 being separable from each other creating the void 3 for enclosing one vacuum conveyor 21 being connected to a vacuum source (not shown) creating the second vacuum.

Figure 5B:
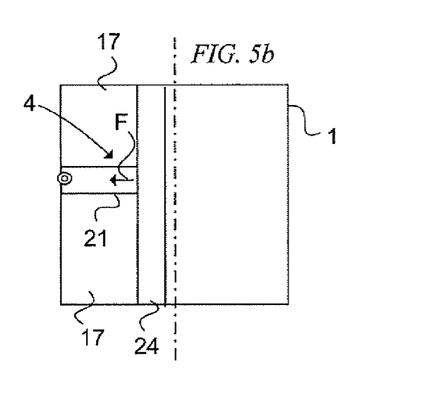
FIG. 5b illustrates the elastic forming medium in FIG. 5a from above.

Firstly the second vacuum is applied to the vacuum conveyor 21 for achieving a stiffened section 4 (see FIG. 5b) of the elastic forming medium 1 corresponding with, when the elastic forming medium 1 after the completion lies against the forming tool 7 having the blank 15 in between, a forming surface section 5 of the forming tool 7 where the blank 15 requires a forming force being larger than that of surrounding sections 17 of the elastic forming medium 1.

Thereafter the forming procedure starts, as the vacuum conveyor 21 now has a stiffened portion of the elastic forming medium 1 necessary for creating the desired forming force regarding forming force direction and quantity, by applying the first vacuum to a vacuum port 31 leading to the interior 33 of the apparatus 13. The first vacuum draws the elastic forming medium 1 towards the forming tool 7. The upper elastic membrane 23 and the lower elastic membrane 25 are hold together by the second vacuum and the vacuum conveyor creates the stiffened section 4. The elastic forming medium 1 meets the blank 15 and the stiffened section 4 meets the initial part 35 of the forming surface section 5 (here a concave area C) requiring a larger forming force. The elastic forming medium 1 will stretch initially before reaching the blank 15 at the position of the centre line CL and fixing the blank 15 along the centre line CL by pressing it towards the forming tool 7. Thereby the elastic forming medium 1 initially will be stretched before conforming the blank 15 to the elongated forming surface section 5.

The blank 15 is thus conformed onto forming surface sections 5 of the forming tool 7 by drawing the first vacuum against the elastic forming medium 1 for transmitting forming forces from the elastic forming medium 1 to the blank 15.

The upper elastic membrane 23 and the lower elastic membrane 25 will stretch and conform the blank 15 to the forming surface sections 5. When the blank 15 has been fully formed over the concave area of the forming tool 7, the second vacuum is closed whereby the upper elastic membrane 23 and the lower elastic membrane 25 are separated from each other. The lower elastic membrane 25, having less stiffness (and being thinner) than the upper elastic membrane 23, is thus used for the final forming procedure (as a second forming step) of the blank 15 when the second vacuum is not any longer applied to the vacuum conveyor 21 in the void 3. This is advantageously, since the less stiff lower elastic membrane 25 better can form the blank 15 onto the remaining forming sections of the forming tool 7 without any counter force from the upper membrane 23.

Figure 5C:
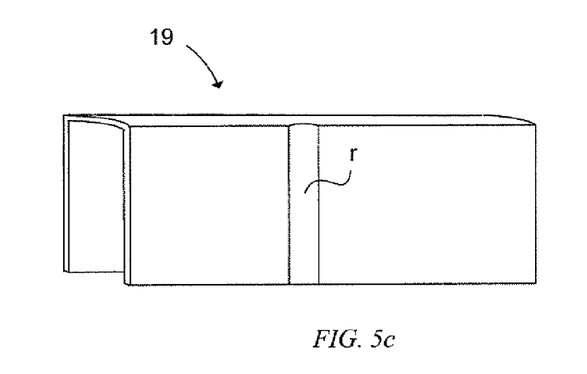

When the forming procedure is finished, the formed blank 15, constituting an article 19, is removed from the forming tool 7 after completion of the evacuation. This is made by closing the first vacuum and removing the elastic forming medium 1 from the apparatus 13 exposing the article 19 (see FIG. 5c). A female radii r at the transition between flange surface section and an elongated indentation of the article 19 thus requires a larger forming force for eliminating wrinkles during the forming process and therefore the stiffness of the elongated stiffened section 4 is larger than the surrounding sections 17 of the elastic forming medium 1. The forming force F and the direction of the forming force can be controlled by providing, by means of the first vacuum, the elongated stiffened section 4, since the forming force F is a function of the strain of the elastic forming medium. A higher forming force is achieved by the application of the first vacuum in the void (either a void limited by internal joining sections, as being shown in FIG. 3, or a void comprising a vacuum conveyor defining the limitation of the stiffened section, as being shown in FIG. 5b). The vacuum conveyor is connected to the vacuum source via a port arranged in the frame of the forming medium 1.

Shear forces within the blank 15 are dependent on the stiffness of the elastic forming medium 1 in different sections and are also dependent on the geometry of the supporting wall 27 of the forming tool 7, shown in FIG. 5a. If the blank 15 must be formed over an even more complex forming surface requiring further forming forces, a part of the supporting wall 27 is arranged higher than other parts of the supporting wall and thus the elastic forming medium 1 will be stretched even more initially and additional shear forces will be generated onto the blank 15 of that specific complex forming surface section 5.

The shear forces will make the plies of the blank 15 to slide relatively each other and the blank 15 will be conformed onto the elongated forming surface section 5 of the forming tool 7. Before applying vacuum onto the elastic forming medium 1 the blank 15 is heated for increasing the viscosity of the blank material, wherein the plies can slide more easily relative each other.

Figures 6A, 6B:
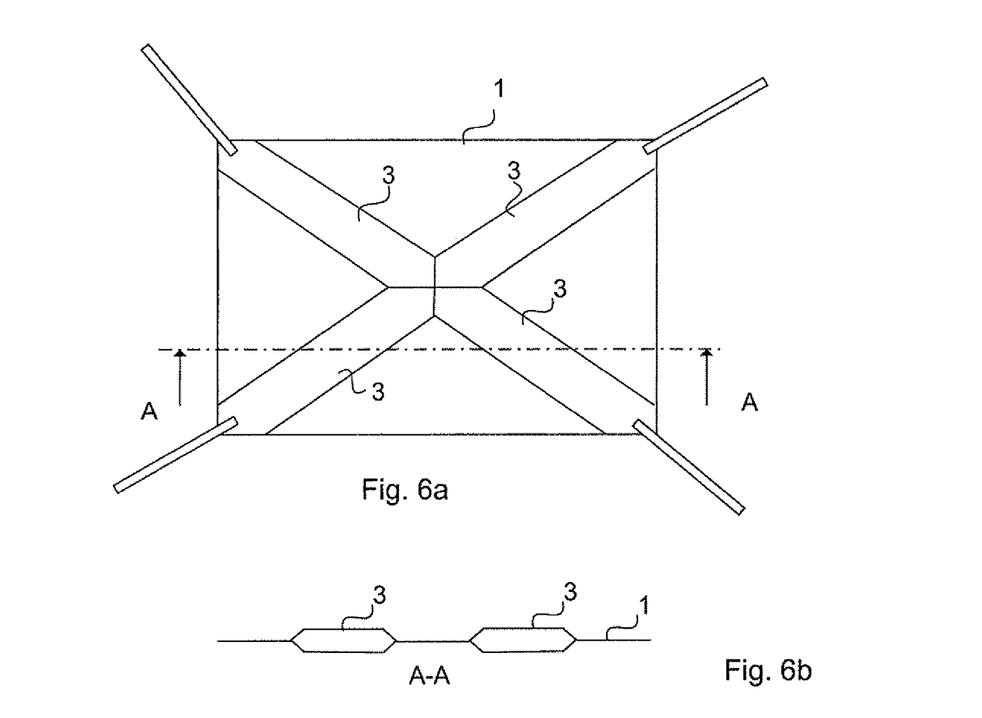
Figure 6C:
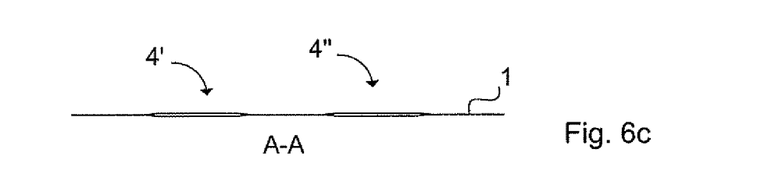
FIG. 6c illustrates the cross-section A-A in FIG. 6b when the second vacuum is applied.
Figure 6D:
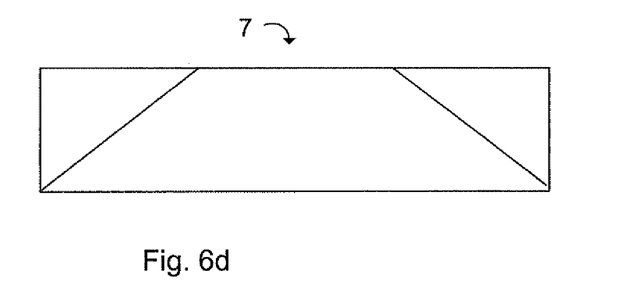

FIG. 6a illustrates an elastic forming medium 1 comprising four controllable voids 3 for stiffening be means of a second vacuum. Each void 3 is connected to a separate vacuum source creating different negative pressures for each void 3. In this way different stiffness can be achieved for the forming of different complex forming sections of the blank 15 being formed over the forming tool 7 illustrated in FIG. 6d. FIG. 6b illustrates a cross-section A-A of the elastic forming medium 1 in FIG. 6a when no second vacuum is applied. FIG. 6c illustrates the cross-section in FIG. 6b when the second vacuum is applied creating two stiffened sections 4', 4".

Figure 7A:
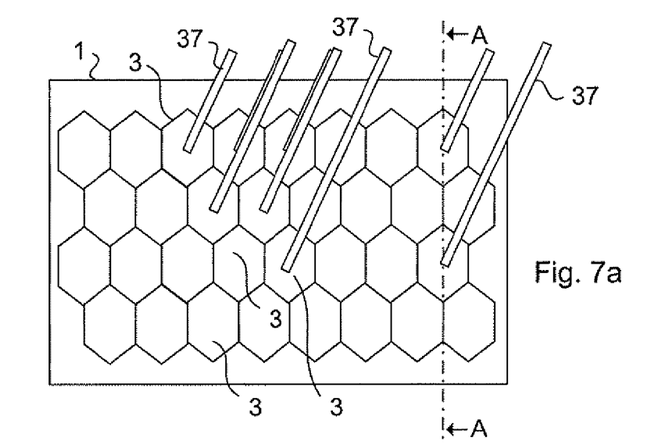
FIG. 7a illustrates an elastic forming medium having a plurality of controllable voids according to a third embodiment of the invention.
Figures 7B, 7C:
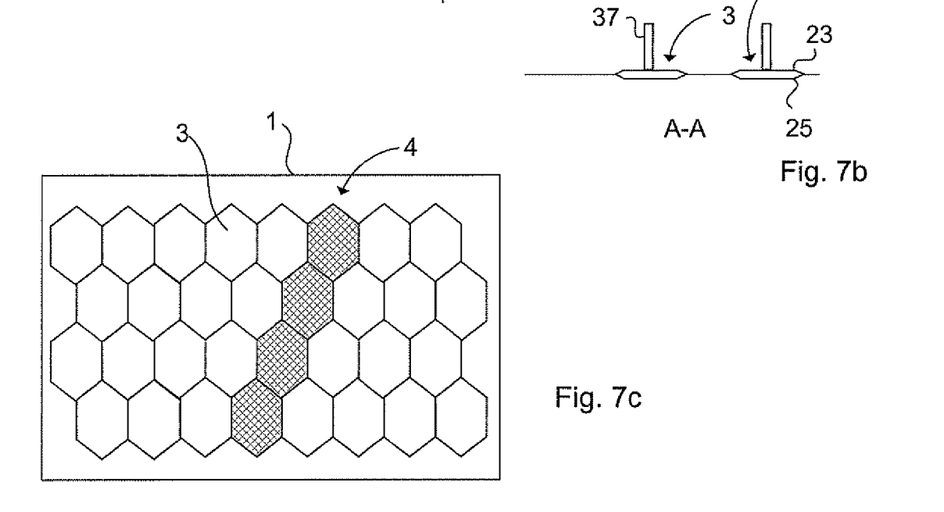
Figure 7D:
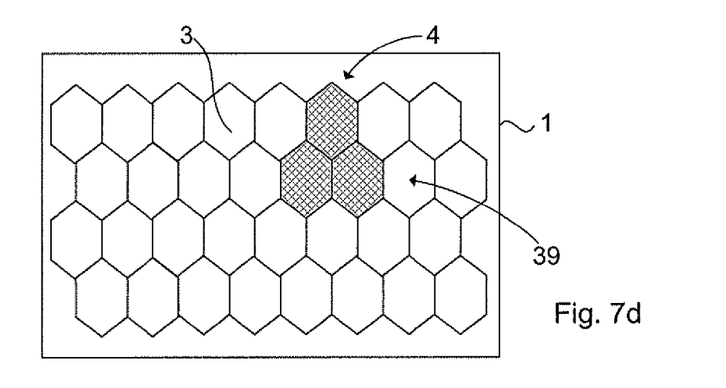
FIG. 7d illustrates the elastic forming medium in FIG. 7a controlled for a second application.

FIG. 7a illustrates an elastic forming medium 1 made of an elastomeric material having a plurality of controllable voids 3. Each void 3 is connected to a negative pressure (all connections are not illustrated for sake of clarity). Each void 3 has an upper elastic membrane 23 and a lower elastic membrane 25 as is shown in FIG. 7b. They will be pressed against each other when applying the first vacuum (negative pressure) creating, by the high friction, a stiffened portion of the forming medium 1. FIG. 7c illustrates the elastic forming medium 1 in FIG. 7a controlled for a first application, wherein is provided an inclined stiffened section 4 of the elastic forming medium 1. Thereby the direction of forming forces can be controlled by a control unit (not shown) controlling the negative pressures for each void 3. This is a different way of controlling the desired quantity and direction of the forming forces than the way shown in FIGS. 4a and 4b where the forming force directions are controlled by exchanging the vacuum conveyors 21 in the elastic forming medium 1. FIG. 7d illustrates the elastic forming medium 1 in FIG. 7a controlled for a second application, wherein an isolated point 39 is stiffened for the forming of a specific complex forming surface section 5 of the forming tool 7.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims. The elongated forming surface section of all embodiments can be concave, convex, or be of other bevelled curvatures having a protrusion or cavity in a plane forming surface section of the forming tool. The blank being formed is comprised of a resin impregnated lay-up of a plurality of plies having reinforcing fibres (not shown). The plies are made of so called pre-preg tape and can be produced by using an ATL-machine (automatic tape lying machine). This also will add cost-effectiveness for the method. The present invention can be employed for manufacture of beams, panels, bulkheads etc. in air craft industry. Of course, the formed blank can be removed from the forming surface sections before curing the blank. The curing can be performed later together with another article or even after a post forming procedure.

The invention claimed is:

1. A method of conforming a blank onto forming surface sections of a forming tool by drawing a first vacuum against an elastic forming medium for transmitting forming forces from the elastic forming medium to the blank, the method comprising:
    applying the blank to the forming tool;
    enclosing the blank within the elastic forming medium, wherein the elastic forming medium comprises at least one void;
    evacuating the elastic forming medium with the first vacuum for allowing the elastic forming medium to stretch and conform the blank to the forming surface sections;
    applying a second vacuum to the at least one void in the elastic forming medium to achieve at least one stiffened section of the elastic forming medium corresponding with a location of the at least one void in the elastic forming medium and corresponding with a forming surface section of the forming tool at which the blank requires application of a forming force on the blank larger than a forming force on the blank of surrounding sections of the forming tool when the elastic forming medium lies against the blank and the blank lies against the forming tool after completion of the evacuation; and
    removing the formed blank, constituting an article, from the forming tool after completion of the evacuation.

2. The method according to claim 1, wherein applying the second vacuum to said at least one void precedes evacuating the elastic forming medium with the first vacuum.

3. The method according to claim 1, wherein at the at least one void of the elastic forming medium comprises an upper elastic membrane and a lower elastic membrane separable from each other, thereby creating the at least one void for enclosing at least one vacuum conveyor being connected to a vacuum source creating the second vacuum.

4. The method according to claim 3, wherein the vacuum conveyor is elongated.

5. The method according to claim 3, wherein the upper elastic membrane is stiffer than the lower elastic membrane.

6. The method according to claim 1, further comprising:
    heating the blank to increase viscosity of the bland prior to evacuating the elastic forming medium.

7. The method according to, claim 1, wherein the forming tool comprises at least one supporting wall arranged for supporting the elastic forming medium such that the elastic forming medium is held a distance from the forming surface section before evacuating the elastic forming medium.

* * * * *